Patented Apr. 15, 1930

1,754,827

UNITED STATES PATENT OFFICE

ALBERT W. HOLMBERG, OF SOUTH ORANGE, NEW JERSEY, ASSIGNOR TO AMERICAN RUBBER COMPANY, OF BOSTON, MASSACHUSETTS, A CORPORATION OF MASSACHUSETTS

WATERPROOFING COMPOSITION

No Drawing. Application filed May 4, 1925. Serial No. 28,016.

This invention relates to an improved waterproofing composition and to sheet materials coated therewith.

Rubber in the form of latex and in cement form has been used for waterproofing sheet materials such as paper, fabrics, and the like. Another method of waterproofing consists in treating the sheet material with a wax, either as such or as a solution.

The present invention has for one of its objects the preparation of an improved waterproofing composition which consists in part of an aqueous dispersion of rubber and a wax. Another object of the invention is to prepare stable waterproofing compositions containing an emulsion of a wax and rubber dispersed in a non-solvent thereof. Still another object of the invention is to prepare waterproof compositions which are highly adherent to the sheet material which is to be waterproofed. A further object is to produce waterproof coatings which shall be flexible.

With a particular embodiment in mind, but without intention to limit the scope of the invention beyond what is required by the prior art, the invention, broadly stated, consists in emulsifying a wax in a non-solvent thereof, and mixing the emulsion with an aqueous dispersion of rubber. The invention also includes the distribution of filling materials in the wax emulsion-rubber dispersion, and it embraces the use of a mineral oil as a medium for the wax.

In practicing the invention, Montan wax is emulsified in the presence of a small amount of a protective colloid, such as glue, saponin, karaya gum, or other suitable agent. The oil is included in this emulsion. A dispersion of a filling material such as gilders' whiting in an aqueous dispersion of rubber, either artificial latex or the natural latex, is prepared, and to it is added the emulsion of the wax and glue. As a specific example of the proportions and materials which may be employed, the following is illustrative, the parts being by weight:

100 parts rubber as latex; 125 parts gilders' whiting; 20 parts Montan wax; 30 parts spindle oil; 10 parts glue.

Instead of the gilders' whiting in the above example, talc, or other inert filling material may be used, and the proportion may be varied if desired. Montan wax may be varied in amount, or may be replaced, in whole or in part, by paraffin, carnauba wax, ceresin, beeswax, candellila wax, or other similar material. In preparing the above compound, water may be added to obtain the desired consistency.

The composition may be spread in any desired manner on a sheet material. It is particularly suited to the waterproofing of those types of paper used as bag linings and shipping container linings and which are employed where a non-tacky surface is required as in protective wrappers for water-sensitive products such as Portland cement, plaster of Paris, flour, grain, meal, chemicals and other similar products. The coating has a high degree of adhesion to the paper and forms a waterproof flexible sheet material which is capable of withstanding the ingress of water, even though the latter be under some pressure. As an illustration, a paper bag treated with these compositions may be completely filled with water and surrounded by fresh Portland cement, without the cement becoming set. Or, a coated paper bag may be filled with fresh Portland cement and placed in water, without any risk to the contents of the bag.

It will be apparent that such waterproofing compositions and sheet materials proofed with these compositions have a wide application in the industry of packing and shipping water-sensitive materials. The compositions are inexpensive and at the same time can be easily applied by the usual types of spreading and coating machinery to fibrous sheet material, such as paper, fabrics, and the associations of fibres employed as protective wrappings for water-sensitive materials or in other instances where waterproof sheets are utilized.

Having thus described my invention, what I claim and desire to protect by Letters Patent is:

1. A composition for forming a waterproofing coating comprising an aqueous dispersion of rubber containing an emulsion of wax and spindle oil.

2. A composition for forming a waterproofing coating comprising an aqueous dispersion of rubber containing an emulsion of vegetable wax and spindle oil and filling material.

3. A composition for forming a waterproofing coating comprising rubber latex containing an emulsion of wax and spindle oil.

4. A composition for forming a waterproofing coating comprising rubber latex containing an emulsion of Montan wax, spindle oil, glue, and filling material.

Signed at New York, county and State of New York, this 29th day of April, 1925.

ALBERT W. HOLMBERG.